(12) United States Patent
Baumann et al.

(10) Patent No.: US 12,553,956 B2
(45) Date of Patent: Feb. 17, 2026

(54) METHOD FOR DETERMINING AT LEAST ONE CHARACTERISTIC PARAMETER OF A COMPONENT OF A DC CONVERTER BY WAY OF AN ELECTRONIC COMPUTER DEVICE, AND ELECTRONIC COMPUTER DEVICE

(71) Applicant: Bayerische Motoren Werke Aktiengesellschaft, Munich (DE)

(72) Inventors: Martin Baumann, Munich (DE); Bert Haj Ali, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 437 days.

(21) Appl. No.: 18/015,986

(22) PCT Filed: Jul. 7, 2021

(86) PCT No.: PCT/EP2021/068738
§ 371 (c)(1),
(2) Date: Jan. 13, 2023

(87) PCT Pub. No.: WO2022/013024
PCT Pub. Date: Jan. 20, 2022

(65) Prior Publication Data
US 2023/0280414 A1    Sep. 7, 2023

(30) Foreign Application Priority Data
Jul. 16, 2020    (DE) .................. 10 2020 118 856.0

(51) Int. Cl.
*G01R 31/62*    (2020.01)
*G01R 31/00*    (2006.01)
(Continued)

(52) U.S. Cl.
CPC ........... *G01R 31/62* (2020.01); *G01R 31/007* (2013.01); *G06F 30/373* (2020.01);
(Continued)

(58) Field of Classification Search
CPC ............... H02M 3/01; H02M 3/33573; H02M 3/33584; H02M 3/33592; H02M 1/0012;
(Continued)

(56) References Cited

U.S. PATENT DOCUMENTS 10,530,251 B1 *    1/2020    Hoffmeister .......... H02M 3/157

FOREIGN PATENT DOCUMENTS

| CN | 109271698 A | 1/2019 |
|----|-------------|--------|
| CN | 108521219 B | 7/2019 |

(Continued)

OTHER PUBLICATIONS

F. Krismer and J. W. Kolar, "Accurate small-signal model for an automotive bidirectional Dual Active Bridge converter," 2008 11th Workshop on Control and Modeling for Power Electronics, Zurich, Switzerland, 2008, pp. 1-10 (Year: 2008).*

(Continued)

*Primary Examiner* — John H Le
(74) *Attorney, Agent, or Firm* — Crowell & Moring LLP

(57) ABSTRACT

A method for determining at least one characteristic parameter of a component of a DC converter for an on-board electrical system of a motor vehicle by way of an electronic computer device includes determining a first transfer function of an HV/LV DC converter based on a small-signal model of the HV/LV DC converter, determining a second transfer function of the DC converter according to the first transfer function in such a way that the DC converter has at least one characteristic substantially identical to a characteristic of the HV/LV DC converter, and determining the at (Continued)

least one characteristic parameter of the component of the DC converter according to the second transfer function.

10 Claims, 2 Drawing Sheets

(51) Int. Cl.
  *G06F 30/373* (2020.01)
  *G06F 111/10* (2020.01)
  *G06F 119/06* (2020.01)
  *H02M 1/00* (2007.01)
  *H02M 3/335* (2006.01)
(52) U.S. Cl.
  CPC ..... *H02M 1/0012* (2021.05); *H02M 3/33573* (2021.05); *H02M 3/33584* (2013.01); *G06F 2111/10* (2020.01); *G06F 2119/06* (2020.01)
(58) Field of Classification Search
  CPC ....... G01R 31/007; G01R 31/62; G06F 30/15; G06F 30/373; G06F 2119/06; G06F 2111/10; Y02B 70/10
  USPC .......................................................... 702/57
  See application file for complete search history.

(56) References Cited

FOREIGN PATENT DOCUMENTS

| | | |
|---|---|---|
| DE | 10 2017 208 891 A1 | 11/2018 |
| DE | 10 2019 116 268 A1 | 12/2020 |
| EP | 3 296 144 B1 | 4/2020 |

OTHER PUBLICATIONS

International Search Report (PCT/ISA/210) issued in PCT Application No. PCT/EP2021/068738 dated Oct. 27, 2021 with English translation (five (5) pages).

German-language Written Opinion (PCT/ISA/237) issued in PCT Application No. PCT/EP2021/068738 dated Oct. 27, 2021 (six (6) pages).

German-language Search Report issued in German Application No. 10 2020 118 856.0 dated Jun. 10, 2021 with partial English translation (10 pages).

Krismer, F. et al., "Accurate Small-Signal Model for the Digital Control of an Automotive Bidirectional Dual Active Bridge", IEEE Transactions on Power Electronics, Dec. 2009, pp. 2756-2768, vol. 24, No. 12, XP055213479 (13 pages).

\* cited by examiner

METHOD FOR DETERMINING AT LEAST ONE CHARACTERISTIC PARAMETER OF A COMPONENT OF A DC CONVERTER BY WAY OF AN ELECTRONIC COMPUTER DEVICE, AND ELECTRONIC COMPUTER DEVICE

BACKGROUND AND SUMMARY OF THE INVENTION

The invention relates to a method for determining at least one characteristic parameter of a component of a DC-DC voltage converter for an on-board electrical system of a motor vehicle by way of an electronic computing device. The invention furthermore relates to an electronic computing device.

It is known from the field of automotive engineering that motor vehicles will be operated in particular electrically in the future. To this end, motor vehicles that are at least in part electrically operated have at least one on-board electrical system. In particular, an HV energy store and an appropriate HV/LV DC-DC voltage converter are installed in the applicable on-board electrical system in order to produce a low voltage from the high voltage, for example for further electrical components, in particular loads. For example, DC-DC voltage converters which convert the voltage from a high voltage of 400 volts to 12 volts can be installed. Furthermore, it is known for a chemical LV store, which can provide the low voltage, to be installed on the LV side. In order to cut costs and save installation space, however, it is useful to reduce the size of this LV-side energy store or to omit it entirely.

Power availability restricted by the omission of the LV store is, in particular in the case of highly automated driving operation of the motor vehicle, particularly safety-critical. High power peaks can damage electrical components, reduce the performance thereof, lead to malfunctions or adversely affect the voltage stability of the on-board electrical energy system. The demands on a DC-DC voltage converter which supplies power to the electrical energy system are significant, in particular when LV stores are of reduced size. In particular, DC-DC voltage converters on the LV level then need to have very high dynamic performance in order to compensate for power fluctuations. In particular in the case of DC-DC voltage converters at the LV level, low dynamic performance is reported, however. This restricted dynamic performance, which arises in particular in digital control with delay times or dead times, enables this DC-DC voltage converter to compensate for transient processes or undesirable system perturbations, which negatively influence voltage stability, only to a limited extent.

The object of the present invention is to provide a method and an electronic computing device which can be used to parameterize a DC-DC voltage converter that can be used at an LV level and can be highly dynamic at the same time.

This object is achieved by a method and by an electronic computing device according to the claimed invention.

One aspect of the invention relates to a method for determining at least one characteristic parameter of a component of a DC-DC voltage converter for an on-board electrical system of a motor vehicle by way of an electronic computing device, in which method a first transfer function of an HV/LV DC-DC voltage converter is determined based on a small-signal response of the HV/LV DC-DC voltage converter, and in which method a second transfer function of the DC-DC voltage converter is determined depending on the first transfer function in such a way that the DC-DC voltage converter has at least one property that is substantially identical to that of the HV/LV DC-DC voltage converter, and the at least one parameter of the component of the DC-DC voltage converter is determined depending on the second determined transfer function.

In particular, an opportunity is thus provided to transfer the dynamic performance of an HV/LV DC-DC voltage converter to a DC-DC voltage converter which is an LV/LV converter, for example, by scaling the voltage class and the power class, for example. Despite its lower power and lower voltage, the DC-DC voltage converter allows a substantially identical dynamic step response and is thus suitable for highly dynamic processes in on-board electrical systems with reduced store size. In particular, it is thus illustrated how the DC-DC voltage converter can be parameterized in order to exhibit particularly high dynamic performance. In particular, it is shown how a high dynamic performance of an HV/LV DC-DC voltage converter can be replicated in another converter, in particular in the DC-DC voltage converter.

To this end, there can be provision, for example, in a first step, for the formulation of the HV/LV DC-DC voltage converter to be formulated in state space as a small-signal model. The transfer functions, which should have an identical response in both DC-DC voltage converters, are established. The scaling, for example of the voltage, is performed and the transfer function is examined for sensitivities. In a last step, the sensitive transfer function and the parameters thereof are analyzed and the adjusted parameterization is determined.

At this juncture it is mentioned in particular that the properties of the HV/LV DC-DC voltage converter can thus be "scaled down" to the DC-DC voltage converter with lower voltages. Alternatively, it is also possible to "scale up" from the DC-DC voltage converter with the low voltages to the HV/LV DC-DC voltage converter. In other words, a property of the DC-DC voltage converter, which in particular is an LV DC-DC voltage converter, can likewise be carried out to the HV/LV DC-DC voltage converter by way of the method according to embodiments of the invention. Furthermore, the method can be applied based on the input voltages and alternatively or additionally based on the output voltages of the DC-DC voltage converters.

According to one advantageous configuration, the characteristic parameter is determined in such a way that the DC-DC voltage converter has a step response that is substantially identical to that of the HV/LV DC-DC voltage converter. In particular, despite a low power and a low voltage within the DC-DC voltage converter, a substantially identical dynamic step response can thus be replicated, as a result of which the DC-DC voltage converter is suitable even for highly dynamic processes in on-board electrical systems with reduced store size.

Moreover, it is advantageous if the characteristic parameter is determined in such a way that the DC-DC voltage converter has a Bode plot that is substantially identical to that of the HV/LV DC-DC voltage converter. The Bode plot is understood to mean a representation of two function graphs, wherein one graph illustrates the amplitude amplification and the other graph illustrates the phase shift of a complex-valued function depending on the frequency. In particular, provision is now made for the DC-DC voltage converter to have the same Bode plot as the HV/LV DC-DC voltage converter. The applicable properties of the HV/LV DC-DC voltage converter can thus be replicated on the DC-DC voltage converter. As a result, the DC-DC voltage converter can be used highly dynamically even for transient processes within the motor vehicle, in particular within the on-board electrical system of the motor vehicle.

Furthermore, it has proven to be advantageous if the HV/LV DC-DC voltage converter and the DC-DC voltage converter are each provided as a full bridge. The full bridge can in particular also be referred to as an H-bridge. In the basic form, the full bridge has, for example, five two-terminal networks connected together in the form of an H. In particular, the present method can be applied to any DC-DC voltage converter having a full bridge. Said DC-DC voltage converter can thus be replicated accordingly in different fields of application of DC-DC voltage converters.

In a further advantageous configuration, the HV/LV DC-DC voltage converter and the DC-DC voltage converter are each provided as electrically isolated DC-DC voltage converters. In particular, the two DC-DC voltage converters thus have an electrically isolated transformer device.

Furthermore, it has proven to be advantageous if the HV/LV DC-DC voltage converter and the DC-DC voltage converter are each provided as bidirectional DC-DC voltage converters. In other words, a transformation can be carried out in both directions. A transformation can thus be carried out either from the lower voltage level to the higher voltage level or from the higher voltage level to the lower voltage level. As a result, the DC-DC voltage converter is able to be used in a highly flexible manner within the on-board electrical system of the motor vehicle.

It is likewise advantageous if the characteristic parameter determined is a value of a leakage inductance as the component of the DC-DC voltage converter. In particular, the step response and the Bode plot of the two DC-DC voltage converters can be accordingly adjusted based on a parameter adjustment for the leakage inductance. The at least one characteristic property can thus accordingly be realized identically.

According to a further advantageous configuration, the characteristic parameter determined is a value of a duty cycle as the component of the DC-DC voltage converter. Should it not be possible to adjust the leakage inductance due to unrealistic parameter values for the leakage inductance, for example, the transformation ratio can be adjusted and the applicable duty cycle can be determined, meaning that the characteristic property of the two DC-DC voltage converters can be realized substantially identically.

It is likewise advantageous if a respective transformation ratio of the HV/LV DC-DC voltage converter and of the DC-DC voltage converter are taken into account when determining the characteristic parameter. A further opportunity is thus provided to adjust the characteristic property accordingly. In particular by adjusting the transformation ratio, a further opportunity is thus provided to be able to replicate the characteristic property of the HV/LV DC-DC voltage converter on the DC-DC voltage converter.

A further aspect of the invention relates to an electronic computing device for determining at least one characteristic parameter of a component of a DC-DC voltage converter for an on-board electrical system of a motor vehicle, wherein the electronic computing device is designed for carrying out a method according to the preceding aspect. In particular, the method is carried out by way of the electronic computing device.

Yet another aspect of the invention relates to a computer program product having program instructions, wherein the computer program product causes an electronic computing device, which carries out the program instructions, to carry out a method according to the improved concept. Yet another aspect relates to a computer-readable storage medium having a computer program product according to the preceding aspect.

Advantageous configurations of the method can be considered to be advantageous configurations of the electronic computing device, of the computer program product and of the computer-readable storage medium. For this purpose, the electronic computing device has substantive features which make it possible to carry out the method or an advantageous configuration thereof.

Further features of the invention will become apparent from the claims, the figures and the description of the figures. The features and combinations of features mentioned above in the description and the features and combinations of features mentioned below in the description of the figures and/or shown on their own in the figures can be used not only in the respectively specified combination but also in other combinations or on their own.

The invention is now explained in more detail on the basis of a preferred exemplary embodiment and with reference to the drawings.

DETAILED DESCRIPTION OF THE DRAWINGS

Identical or functionally identical elements are provided with the same reference signs in the figures.

Figure 1:
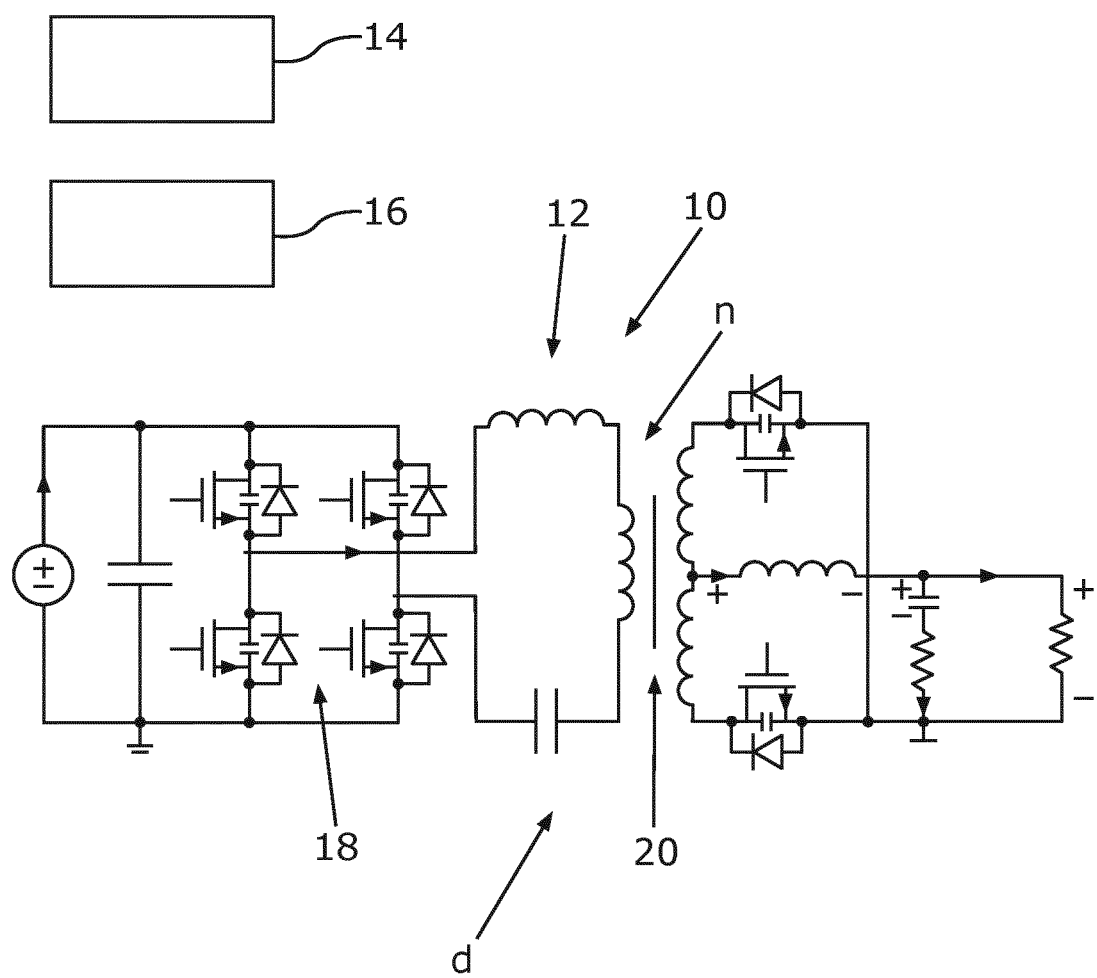
FIG. 1 shows a schematic block diagram of one embodiment of a DC-DC voltage converter.

FIG. 1 shows a schematic view of a block diagram of a DC-DC voltage converter 10. In the present case, this block diagram can be considered both for the DC-DC voltage converter 10 and for an HV/LV DC-DC voltage converter 12. In a method for determining at least one characteristic parameter of a component of the DC-DC voltage converter 10 for an on-board electrical system of a motor vehicle 14, which is represented purely schematically, by way of an electronic computing device 16, which is likewise represented purely schematically, a first transfer function of the HV/LV DC-DC voltage converter 12 is determined based on a small-signal response of the HV/LV DC-DC voltage converter 12 and a second transfer function of the DC-DC voltage converter 10 is determined depending on the first transfer function in such a way that the DC-DC voltage converter 10 has at least one property that is substantially identical to that of the HV/LV DC-DC voltage converter 12, and the at least one parameter of the component of the DC-DC voltage converter 10 is determined depending on the second determined transfer function. In particular, provision can be made for the characteristic parameter determined to be a value of a leakage inductance LK as the component of the DC-DC voltage converter 10. Furthermore, the characteristic parameter determined can be a value of a duty cycle d as the component of the DC-DC voltage converter 10. Furthermore, a respective transformation ratio n of the HV/LV DC-DC voltage converter 12 and of the DC-DC voltage converter 10 can also be taken into account when determining the characteristic parameter.

In particular, it is further shown that the DC-DC voltage converter 10 and the HV/LV DC-DC voltage converter 12 are respectively in the form of a full bridge 18. The HV/LV DC-DC voltage converter 12 and the DC-DC voltage converter 10 are in particular provided as electrically isolated DC-DC voltage converters 10, 12. In particular, the HV/LV DC-DC voltage converter 12 and the DC-DC voltage converter 10 thus have a transformer element 20. The HV/LV DC-DC voltage converter 12 and the DC-DC voltage converter 10 can in particular each be provided as bidirectional DC-DC voltage converters 10, 12. The HV/LV DC-DC voltage converter 12 and the DC-DC voltage converter 10 each have an input voltage Vin and an output voltage Vo. For example, the HV/LV DC-DC voltage converter 12 can have an input voltage Vin of 400 volts and the output voltage Vo can be 12 volts.

The method according to embodiments of the invention now has provision for the DC-DC voltage converter 10 to be designed in such a way that, for example, the property of this described HV/LV DC-DC voltage converter 12 is adopted by the DC-DC voltage converter 10, wherein the DC-DC voltage converter 10 then has an input voltage Vin of 48 volts, for example, and has an output voltage Vo of 12 volts. These numbers are purely exemplary and are in no way to be regarded as definitive. Other input voltages Vin and output voltages can also be replicated. This applies to the input voltages Vin and output voltages Vo both for the HV/LV DC-DC voltage converter 12 and for the DC-DC voltage converter 10. It is known that an applicable DC-DC voltage converter 10 cannot be as dynamic as the HV/LV DC-DC voltage converter 12. In the present case, provision is now made for a dynamic performance that is identical to that of the HV/LV DC-DC voltage converter 12 to be found in the DC-DC voltage converter 10 by virtue of appropriate adjustment of the parameter.

To this end, provision is in particular made for the HV/LV DC-DC voltage converter 12 to be formulated in state space as a small-signal model. The respective transfer functions of the HV/LV DC-DC voltage converter 12 and of the DC-DC voltage converter 10, which should have an identical response in both DC-DC voltage converters 10, 12, are established. The voltage, for example, is then scaled in such a way and the transfer function is examined for sensitivities. The sensitive transfer functions are then analyzed and the adjusted parameters are parameterized and determined.

Figure 2:
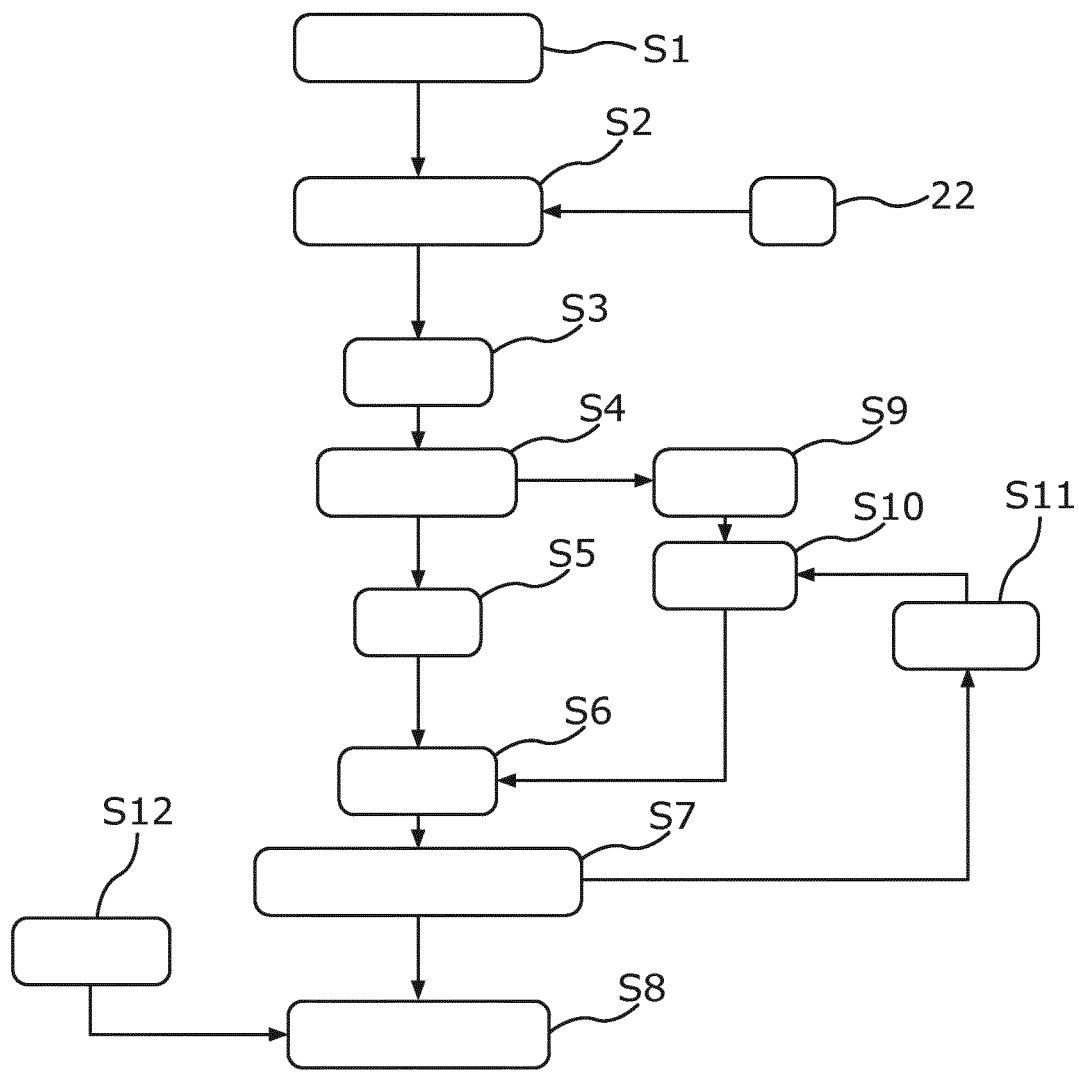
FIG. 2 shows a schematic flowchart of one embodiment of the method.

FIG. 2 shows a schematic flowchart of one embodiment of the method. In a first step, the respective parameters of the HV/LV DC-DC voltage converter 12 are determined. In particular, the input voltage Vin and the output voltage Vo of the HV/LV DC-DC voltage converter 12 are determined. Furthermore, the transformation ratio n, the leakage inductance LK and the duty cycle d are determined. In a second step S2, a factor Kv is determined depending on the input voltage Vin of the HV/LV DC-DC voltage converter 12 and of the DC-DC voltage converter 10 and the output voltages Vo of the HV/LV DC-DC voltage converter 12 and of the DC-DC voltage converter 10. To this end, the desired parameters 22 of the DC-DC voltage converter 10 are in particular taken into account. In a third step S3, the transformation ratio n of the HV/LV DC-DC voltage converter 12 is expressed in relation to the factor Kv and gives the new transformation ration of the DC-DC voltage converter 10. A fourth step S4 comprises checking whether the transformation ratio n of the DC-DC voltage converter 10 is also viable. Should this be the case, a further factor Kn corresponds to the factor Kv and the leakage inductance LK can be determined in a fifth step S5. In a sixth step S6, the leakage inductance LK of the DC-DC voltage converter 10 is then determined by expressing the leakage inductance LK of the HV/LV DC-DC voltage converter 12 in relation to the factor Kn squared. The seventh step S7 then comprises checking whether the determined leakage inductance LK of the DC-DC voltage converter 10 is determined to be too large or too small. Should this not be the case, the respective characteristic parameters of the DC-DC voltage converter 10 can be determined in an eighth step S8.

Should it be determined in the fourth step S4 that the transformation ratio n of the DC-DC voltage converter 10 is viable, the transformation ratio n can be rounded in a ninth step S9. A new further factor Kn can then be determined, wherein this factor is in turn determined as the rounded transformation ratio depending on the transformation ratio n of the HV/LV DC-DC voltage converter 12. This is shown in particular in a tenth step S10. From the tenth step S10 it is then in turn possible to move to the sixth step S6 and the applicable leakage inductance LK can be determined.

Should it be determined in the seventh step S7 that the determined leakage inductance LK is too large or too small, the transformation ratio n of the DC-DC voltage converter 10 can be re-adjusted in an eleventh step S11, wherein from the eleventh step S11 it is then in turn possible to move to the tenth step S10 and the new further factor Kn can be determined. Proceeding from the seventh step S7, should it be determined that the factor Kv is not equal to the factor Kn, the duty cycle d can be adjusted in a twelfth step S12. In particular, the ratio of Kv and Kn can be expressed in relation to the old duty cycle d of the HV/LV DC-DC voltage converter 12. From the twelfth step 12, it is then in turn possible to move to the eighth step S8.

On the whole, the invention provides a method for voltage scaling of power electronic converters.

LIST OF REFERENCE SIGNS

10 DC-DC voltage converter
12 HV/LV DC-DC voltage converter
14 motor vehicle
16 electronic computing device
18 full bridge
20 transformer element
22 parameter
S1 first step
S2 second step
S3 third step
S4 fourth step
S5 fifth step
S6 sixth step
S7 seventh step
S8 eighth step
S9 ninth step
S10 tenth step
S11 eleventh step
S12 twelfth step
n transformation ratio
d duty cycle

The invention claimed is:
1. A method for determining a characteristic parameter of a component of a DC-DC voltage converter for an on-board electrical system of a motor vehicle by way of an electronic computing device, the method comprising:
determining a first transfer function of an HV/LV DC-DC voltage converter based on a small-signal response of the HV/LV DC-DC voltage converter,
determining a second transfer function of the DC-DC voltage converter depending on the first transfer function such that the DC-DC voltage converter has a property that is substantially identical to a property of the HV/LV DC-DC voltage converter, determining the characteristic parameter of the component of the DC-DC voltage converter depending on the second transfer function, and adjusting the characteristic parameter such that the property of the HV/LV DC-DC voltage converter is adopted by the DC-DC voltage converter, wherein the HV/LV DC-DC voltage converter and the DC-DC voltage converter are each provided as bidirectional DC-DC voltage converters, such that the DC-DC voltage converter is able to be used in a highly flexible manner within the on-board electrical system of the motor vehicle.

2. The method according to claim 1, wherein:
the characteristic parameter is determined such that the DC-DC voltage converter has a step response that is substantially identical to a step response of the HV/LV DC-DC voltage converter.

3. The method according to claim 1, wherein:
the characteristic parameter is determined such that the DC-DC voltage converter has a Bode plot that is substantially identical to a Bode plot of the HV/LV DC-DC voltage converter.

4. The method according to claim 1, wherein:
the HV/LV DC-DC voltage converter and the DC-DC voltage converter are each provided as a full bridge.

5. The method according to claim 1, wherein:
the HV/LV DC-DC voltage converter and the DC-DC voltage converter are each provided as electrically isolated DC-DC voltage converters.

6. The method according to claim 1, wherein:
the characteristic parameter is a value of a leakage inductance as the component of the DC-DC voltage converter.

7. The method according to claim 1, wherein:
the characteristic parameter is a value of a duty cycle as the component of the DC-DC voltage converter.

8. The method according to claim 1, wherein:
a transformation ratio of the HV/LV DC-DC voltage converter and a transformation ratio of the DC-DC voltage converter are taken into account when determining the characteristic parameter.

9. An electronic computing device for determining the characteristic parameter of the component of the DC-DC voltage converter for the on-board electrical system of the motor vehicle, wherein the electronic computing device is configured to carry out the method according to claim 1.

10. A method for determining a characteristic parameter of a component of a DC-DC voltage converter for an on-board electrical system of a motor vehicle by way of an electronic computing device, the method comprising:

determining a first transfer function of an HV/LV DC-DC voltage converter based on a small-signal response of the HV/LV DC-DC voltage converter, determining a second transfer function of the DC-DC voltage converter depending on the first transfer function such that the DC-DC voltage converter has a property that is substantially identical to a property of the HV/LV DC-DC voltage converter, determining the characteristic parameter of the component of the DC-DC voltage converter depending on the second transfer function, and adjusting the characteristic parameter such that the property of the HV/LV DC-DC voltage converter is adopted by the DC-DC voltage converter, wherein the characteristic parameter is determined such that the DC-DC voltage converter has a Bode plot that is substantially identical to a Bode plot of the HV/LV DC-DC voltage converter, such that the DC-DC voltage converter can be used highly dynamically even for transient processes within the motor vehicle.

* * * * *